(12) United States Patent
Kienke et al.

(10) Patent No.: US 8,146,995 B2
(45) Date of Patent: Apr. 3, 2012

(54) VEHICLE SEAT WITH A TUMBLING RECLINER

(75) Inventors: Ingo Kienke, Wermelskirchen (DE); Maharajapuram S. Karthikeyan, Leverkusen (DE)

(73) Assignee: Johnson Controls Technology Company, Holland, MI (US)

( * ) Notice: Subject to any disclaimer, the term of this patent is extended or adjusted under 35 U.S.C. 154(b) by 109 days.

(21) Appl. No.: 12/530,321

(22) PCT Filed: Feb. 26, 2008

(86) PCT No.: PCT/EP2008/001512
§ 371 (c)(1),
(2), (4) Date: Feb. 19, 2010

(87) PCT Pub. No.: WO2008/110261
PCT Pub. Date: Sep. 18, 2008

(65) Prior Publication Data
US 2010/0141007 A1 Jun. 10, 2010

(30) Foreign Application Priority Data

Mar. 9, 2007 (DE) .......................... 10 2007 011 998
Mar. 9, 2007 (DE) .......................... 10 2007 011 999

(51) Int. Cl.
*B60N 2/22* (2006.01)
*B60N 2/235* (2006.01)
(52) U.S. Cl. .................................................. 297/367 R
(58) Field of Classification Search ............... 297/367 R
See application file for complete search history.

(56) References Cited

U.S. PATENT DOCUMENTS

| 7,364,237 | B2 * | 4/2008 | Grable et al. | 297/367 R X |
| 7,478,881 | B2 * | 1/2009 | Leconte | 297/367 R |
| 7,604,297 | B2 * | 10/2009 | Weber | 297/367 R |
| 8,070,231 | B2 * | 12/2011 | Kienke et al. | 297/367 R |
| 2006/0181131 | A1 * | 8/2006 | Kienke et al. | 297/367 |
| 2007/0170764 | A1 * | 7/2007 | Thiel et al. | 297/367 |
| 2010/0096897 | A1 * | 4/2010 | Kienke et al. | 297/367 R |

FOREIGN PATENT DOCUMENTS

| DE | 197 15 764 A1 | 10/1998 |
| DE | 10121020 A1 | 11/2002 |
| DE | 103 13 807 A1 | 9/2004 |
| DE | 103 42 832 A1 | 4/2005 |
| DE | 20 2005 012 733 U1 | 12/2006 |
| EP | 1 334 866 A2 | 8/2003 |

OTHER PUBLICATIONS

International Search Report for application No. PCT/EP2008/001512 mailed Jun. 5, 2008.
German Examination Report for application No. PCT/EP2008/001512 mailed Jul. 3, 2007.

* cited by examiner

*Primary Examiner* — Rodney B White
(74) *Attorney, Agent, or Firm* — Fletcher Yoder P.C.

(57) ABSTRACT

A vehicle seat is provided, particularly for a motor vehicle. The seat includes a seat part and a backrest. A fitting allows for adjusting inclination of the backrest relative to the seat part. The fitting has a lower part connected to the seat part and an upper part that can be locked to a backrest part. The backrest part is mounted in a freely swinging manner relative to the upper part and can be locked in a plurality of positions. The locking takes place in at least one position of the lower part, or on a mounting connected directly to the seat part.

12 Claims, 5 Drawing Sheets

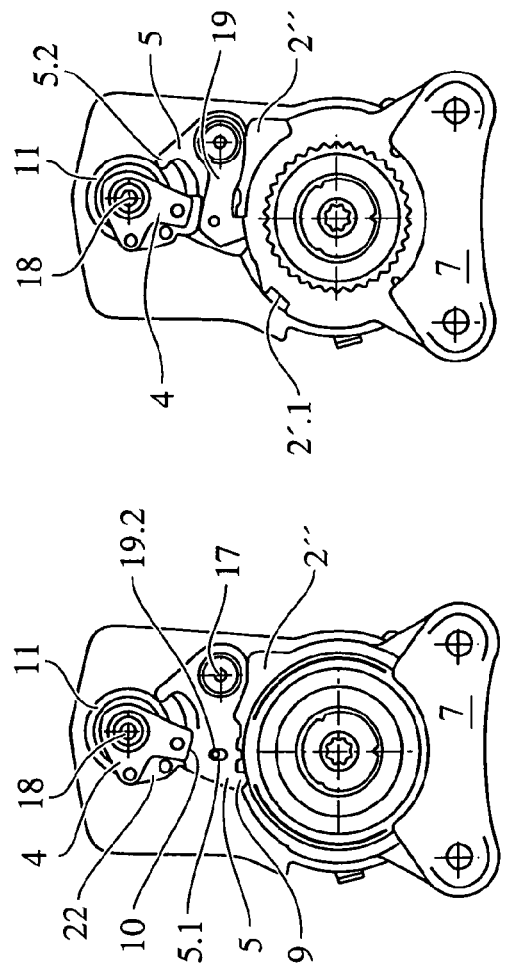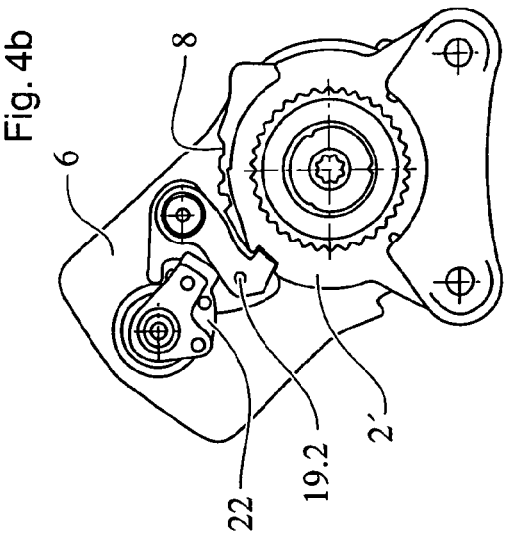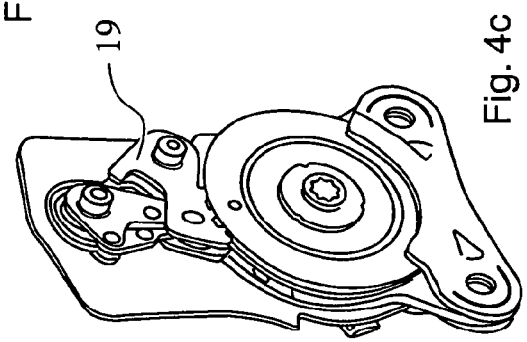

VEHICLE SEAT WITH A TUMBLING RECLINER

CROSS REFERENCE TO RELATED APPLICATIONS

Figure 1:
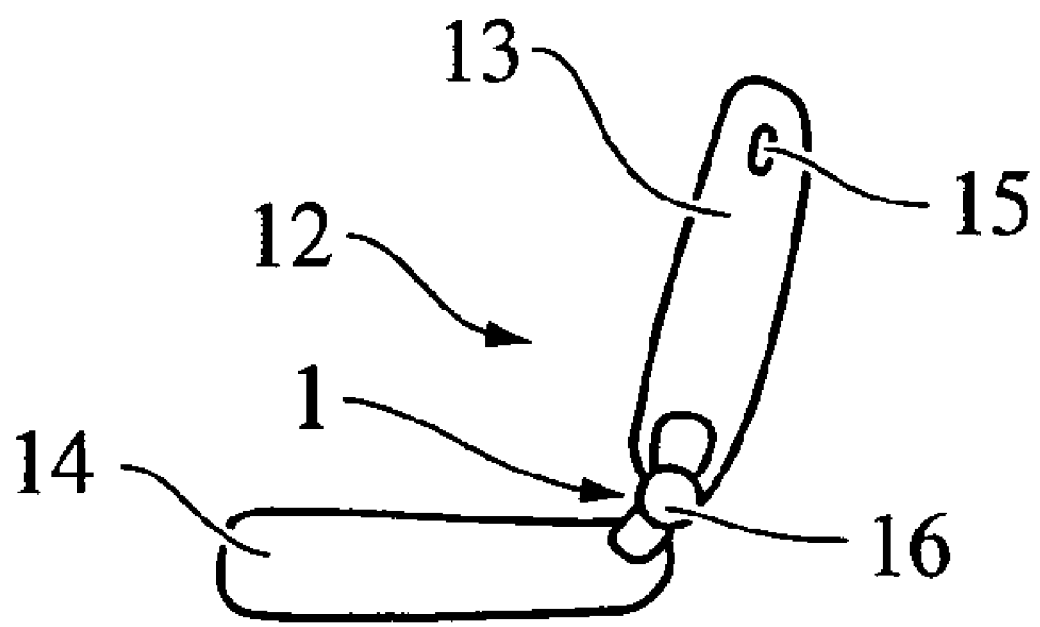

This application claims priority from and the benefit of PCT Application No. PCT/EP2008/001512, filed on Feb. 26, 2008; German Patent No. DE 10 2007 011 999.4, filed on Mar. 9, 2007; and German Patent DE 10 2007 011 998.6, filed on Mar. 9, 2007; all entitled "Vehicle Seat with a Tumbling Recliner", which are herein incorporated by reference.

BACKGROUND

The present invention relates to a vehicle seat, in particular motor vehicle seat, which has a seat part and a backrest, with a fitting for adjusting the inclination of the backrest relative to the seat part, said fitting having a lower part which is connected to the seat part and an upper part which can be locked to a backrest part, wherein the backrest part is mounted, preferably centrally, in a freely swinging manner, relative to the upper part and can be locked in a plurality of positions.

Vehicle seats of the type in question are known, for example, from DE 101 21 020 A1 and have a fitting which can be locked to the backrest and with which the angle of inclination of the backrest can be changed. Said locking can, however, be unlocked such that the backrest of the motor vehicle seat can be transferred into a table position or easy-entry position. In order also to be able to lock the backrest of the motor vehicle seat in said positions, the fitting according to DE 101 21 020 A1 has a comparatively complicated latching mechanism which is difficult to produce and is susceptible to faults.

It was therefore the object of the present invention to provide a vehicle seat which does not have the disadvantages of the prior art.

This object is achieved by a vehicle seat, in particular motor vehicle seat, which has a seat part and a backrest, with a fitting for adjusting the inclination of the backrest relative to the seat part, said fitting having a lower part which is connected to the seat part and an upper part which can be locked to a backrest part, wherein the backrest part is mounted, preferably centrally, in a freely swinging manner, relative to the upper part and can be locked in a plurality of positions, and the locking takes place in at least one position on the lower part or on a mounting connected directly to the seat part.

SUMMARY

The present invention relates to a vehicle seat on which one or more individuals can be seated. The vehicle seat according to the invention can accordingly also be a vehicle seat bench. In order to adjust the inclination of the backrest relative to the seat part, the vehicle seat according to the invention has a fitting, for example a tumbling or latching fitting, which is arranged between the seat part and the backrest. The fitting is preferably a tumbling recliner. Said fitting has a lower part which is connected to the seat part, and an upper part which can be locked to a backrest part. In the unlocked state, said backrest part is mounted in a freely swinging manner relative to the upper part of the fitting, and the fitting and the backrest part preferably have the same axis of rotation.

Furthermore, the backrest part can be locked in a plurality of positions, for example the normal use position, a table position and/or easy-entry position, in order to be able to fix the backrest in the respectively desired position relative to the seat part.

According to the invention, the locking takes place in at least one position on the lower part or on a mounting connected directly to the seat part. According to a further subject matter of the present invention, or preferably, the locking takes place with only one and not more latching means. By means of this embodiment according to the invention, or preferred embodiment, the vehicle seat is extremely simple to produce.

Owing to the fact that the vehicle seat according to the invention has fewer parts than vehicle seats according to the prior art, it is furthermore less susceptible to maintenance and wear. In a preferred embodiment, soiling of the vehicle seat according to the invention is also at least reduced by the fitting being encapsulated. A saving on weight can be realized with the vehicle seat according to the invention.

The latching means preferably has interlocking means which interact with complementary interlocking means which are preferably arranged on the upper part or on the lower part of the fitting. The upper part and/or the lower part particularly preferably have/has interlocking means corresponding to the respective, abovementioned positions of the seat back.

The interlocking means preferably has at least two different regions, the regions differing in particular by the type and/or size of the interlocking means. The interlocking means are very particularly preferably teeth which interact with corresponding teeth, preferably on the upper part and/or the lower part of the fitting. It is mostly preferred for the teeth in the one region to be larger with respect to width and/or length than the teeth in the other region.

The latching means is very particularly preferably a "latching pawl" which is known from recliner manufacturing.

Said latching pawl can preferably be locked with a blocking cam in the respective position, for example the normal use position, easy-entry position or table position. In the last two positions, the backrest is in particular locked with the larger interlocking means which very particularly preferably interacts with interlocking means on the lower part of the recliner or on a mounting which is connected directly to the seat part.

The change in position between the interlocking means on the latching means and on the fitting can very particularly preferably be compensated for by the enlarged interlocking means and/or by an extended locking curve on the latching means, said locking curve interacting with the blocking cam.

In another preferred embodiment, the fitting has an additional interlocking means, for example a hook, which interacts with a complementary interlocking means which is arranged on the lower part or on the mounting. Said interlocking means preferably fixes the position of the backrest in the table and/or easy-entry position. Said interlocking means is preferably arranged rotatably. The pivot point of said additional interlocking means may or may not coincide with the pivot point of the latching means, with coinciding being preferred.

The vehicle seat preferably has a further blocking cam which interacts with the interlocking means and prevents the latter from being inadvertently released.

Said blocking cam is preferably arranged rotatably. The pivot point of said additional blocking cam may or may not coincide with the pivot point of the blocking cam of the latching means, with coinciding being preferred.

The blocking cam preferably actuates and/or locks the interlocking means.

The fittings of the seat according to the invention are preferably of multi-layered construction.

The fitting is preferably a tumbling mechanism and accordingly a "tumbling recliner".

The fitting is preferably at least partially encapsulated in order to reduce the soiling thereof.

DRAWINGS

The invention is explained below with reference to FIGS. 1 to 5. These explanations are merely by way of example and do not restrict the general inventive concept.

Figure 2:
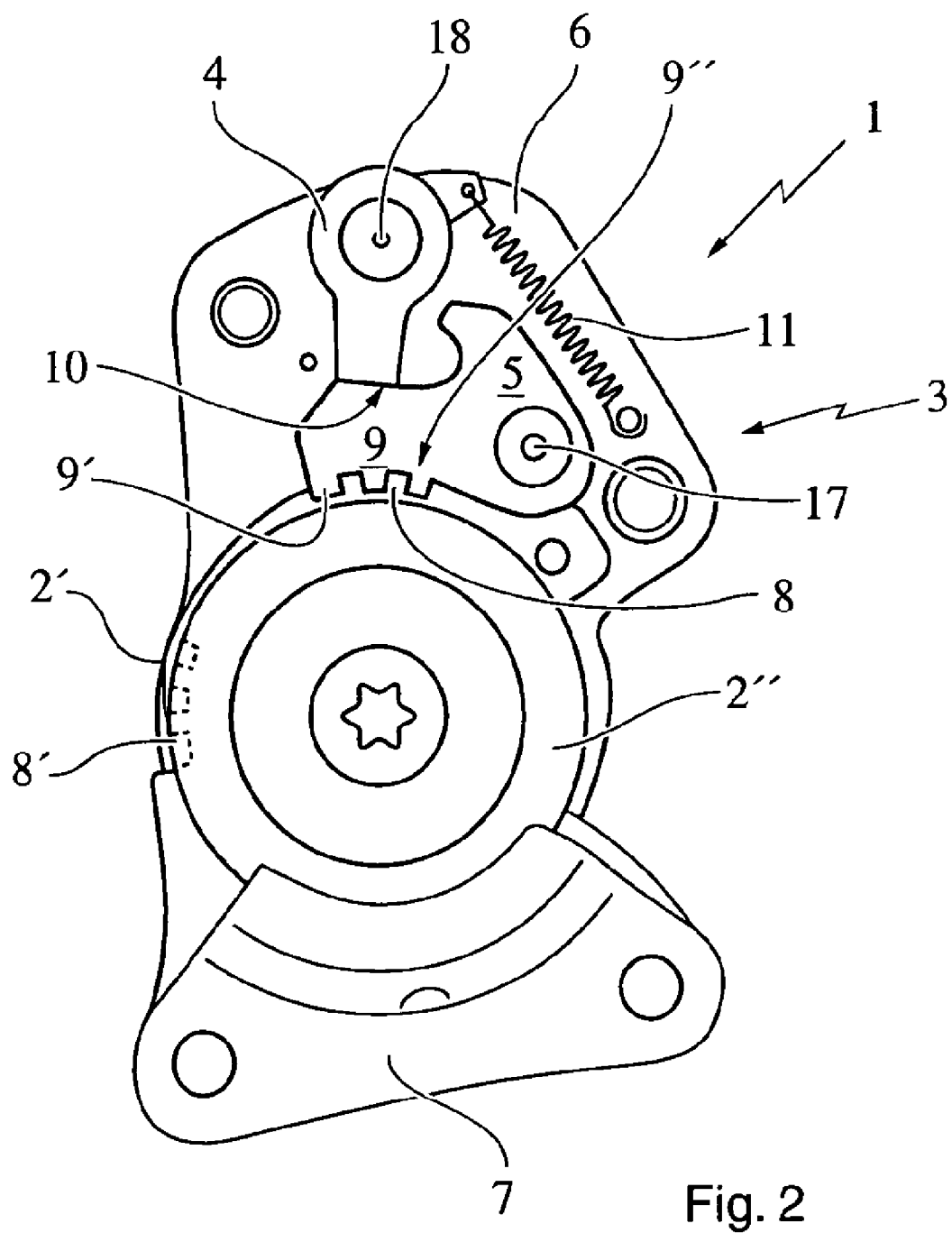
Figure 3:
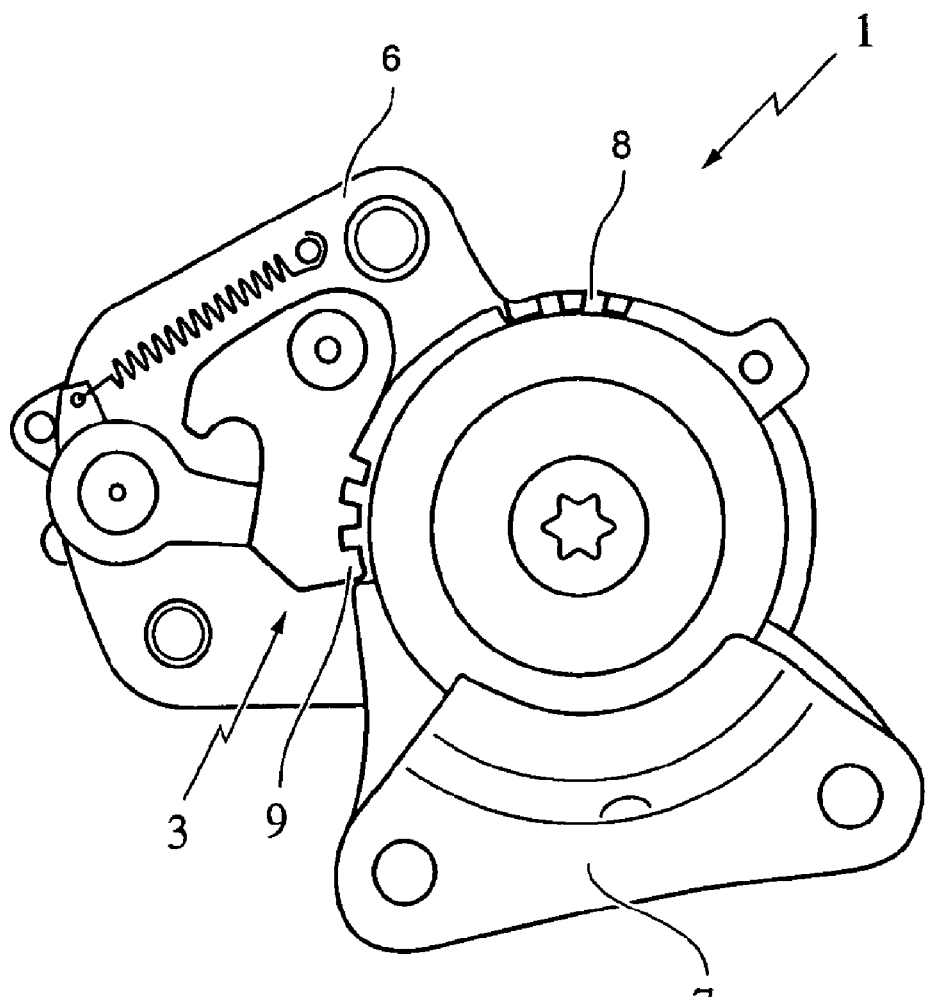
Figure 5A:
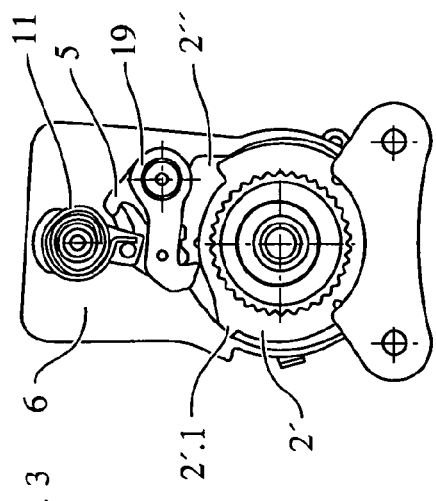
Figure 5C:
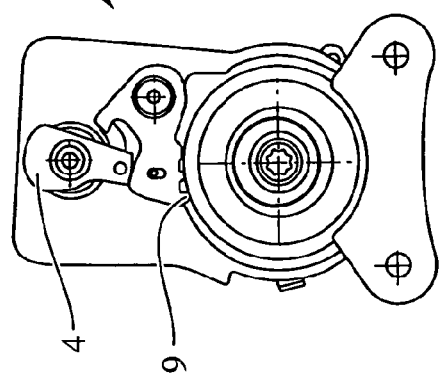
Figure 5B:
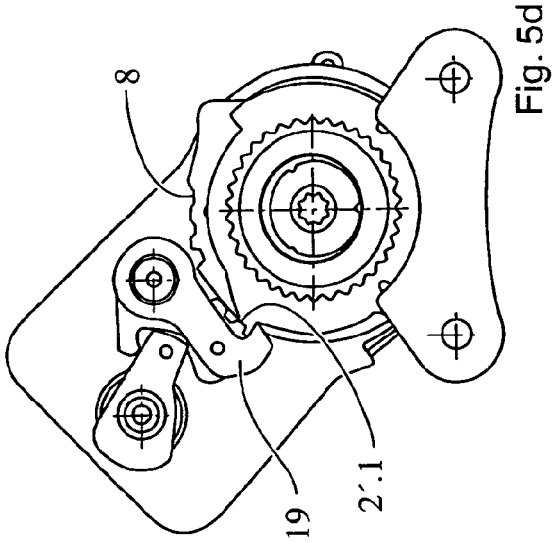
Figure 5D:
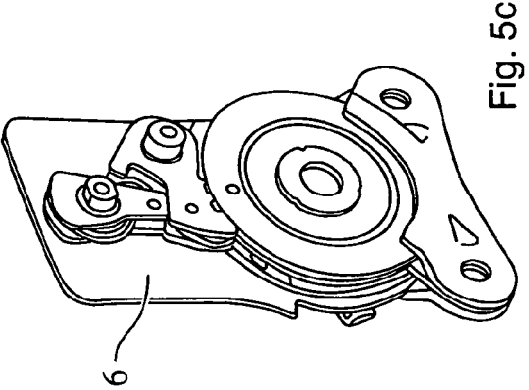

FIG. 1 shows the vehicle seat according to the invention.
FIG. 2 shows the fitting 1 in the normal use position.
FIG. 3 shows the fitting 1 in the table position.
FIG. 4A-D show another embodiment of the fitting 1 in the use and easy-entry positions.
FIG. 5A-D show an additional embodiment of the fitting 1 in the use and easy-entry positions.

DETAILED DESCRIPTION

FIG. 1 show the seat 12 according to the invention with a seat part 14 and a backrest 13. Said backrest 13 is arranged on the seat part 14 by means of the fitting 1. The angle of inclination of the backrest can be adjusted with the hand wheel 16, which interacts with the fitting 1, or with a different, for example motorized, drive. Furthermore, the backrest 13 can be unlocked from the fitting 1 using the unlocking lever 15 or a comparable unlocking mechanism in such a manner that the backrest can be brought, for example, into an easy-entry and/or table position, in which it is arranged substantially horizontally, and can be locked there.

FIG. 2 illustrates a first embodiment of the fitting 1 according to FIG. 1. In the present case, the fitting has a tumbling mechanism for adjusting the inclination of the backrest 13 relative to the seat part 14. Said tumbling mechanism comprises a lower part 2', which is fastened to the seat part by means of the fitting part 7, and an upper part 2" which is arranged on the backrest 13 of the vehicle seat 12 according to the invention by means of the backrest part 6. The backrest part 6, and therefore the backrest, is arranged in a freely swinging manner, preferably centrally, relative to the upper part 2". In order to avoid the backrest part 6 moving inadvertently relative to the upper part 2", the backrest part 6 is locked to the upper part 2" by means of a locking 3. Said locking 3 comprises a latching means 5, in the present case a latching pawl 5, the lower side of which has interlocking means 9 in the form of a toothing. Said toothing 9 has two regions 9', 9", with a larger, preferably longer tooth being arranged in the region 9' than in the region 9". The latching pawl 5 is mounted rotatably about the axis of rotation 17 and is prestressed such that it rotates in the clockwise direction. In order to avoid the latching pawl 5 inadvertently becoming disengaged from the interlocking means 8 arranged on the upper part 2", the locking 3 has a blocking cam 4. The front end of the blocking cam interacts with a locking curve 10 and prevents the latching pawl 5 from rotating in the clockwise direction. In order to release the latching pawl 5, for example by means of the unlocking lever 15, the blocking cam 4 is rotated counterclockwise and counter to the spring force of the spring 11. As a result, the prestressed latching pawl 5 can rotate in the clockwise direction in such a manner that the toothing 9 no longer interacts in an interlocking and/or frictional manner with the toothing 8 of the upper part 2". The backrest part 6 can then be pivoted in a freely swinging manner, for example in the direction of the seat part. In order to be able likewise to lock the backrest part 6, for example in the table and/or easy-entry position, the lower part 2' likewise has a toothing 8' which preferably likewise has two regions having a toothing of differing shape, in particular differing depth. The backrest part 6 can also be locked in this position with the latching pawl 5 and the blocking cam 4. The locking takes place, for example, by releasing or renewed actuation of the unlocking lever 15. Since the tumbling mechanism basically causes an eccentric movement of the backrest part 6 in relation to the fitting part 7 on the seat part side, the latching pawl is provided, according to the invention, with an enlarged first interlocking means 9', preferably a tooth, which compensates for said change in position. The backrest part 6 is therefore preferably held only by the interlocking means 9' in the easy-entry position or table position.

Furthermore, the locking curve 10 on the latching pawl 5, with which the locking cam 4 interacts, is of extended design in comparison to conventional systems such that, as a result, a change in position caused by the tumbling mechanism can also be compensated for and the blocking cam locks the latching pawl in every position. The blocking cam 4 is rotated about the pivot point 18 by means of the spring force 11 until the tip of said blocking cam interacts in an interlocking and/or frictional manner with the locking curve 10.

FIG. 3 illustrates the fitting 1 in the table position. It can clearly be seen that the toothing 9 now interacts with the interlocking means 8' on the lower part 2', and in particular the first region 9' of the toothing is in engagement with the complementary interlocking means on the lower part 2'. By renewed actuation of the unlocking lever 15, the locking in the table position can be released again and the seat can be brought into its normal position in which, in turn, the toothing 9 interacts with the interlocking means 8. A person skilled in the art will see that the interlocking means 8' may also be arranged on a mounting which is arranged directly on the seat part.

FIGS. 4a-4d illustrate a further embodiment of the fitting 1 according to FIG. 1. In the present case, the fitting has a tumbling mechanism for adjusting the inclination of the backrest 13 relative to the seat part 14. Said tumbling mechanism comprises a lower part 2', which is fastened by means of the fitting part 7 to the seat part, and an upper part 2" which is arranged on the backrest 13 of the vehicle seat 12 according to the invention by means of the backrest part 6. The backrest part 6, and therefore the backrest, is mounted in a freely swinging manner, preferably centrally, relative to the upper part 2". In order to avoid the backrest part 6 moving inadvertently relative to the upper part 2", the backrest part 6 is locked to the upper part 2" by means of a locking 3. Said locking 3 comprises latching means 5, in the present case a latching pawl 5, the lower side of which has interlocking means 9 in the form of a toothing. The latching pawl 5 is mounted rotatably about the axis of rotation 17. In order to avoid the latching pawl 5 inadvertently becoming disengaged from the interlocking means 8 arranged on the upper part 2", the locking 3 has a blocking cam 4. The front end of the blocking cam interacts with a locking curve 10 and prevents the latching pawl 5 from rotating in the clockwise direction. In order to release the latching pawl 5, for example by means of the unlocking lever 15, the blocking cam 4 is rotated in the clockwise direction and counter to the spring force of the spring 11. In the process, the cam 4 interacts with the lug 5.2, which is arranged on the latching pawl 5, in such a manner that the latching pawl 5 rotates in the clockwise direction and the toothing 9 no longer interacts in an interlocking and/or frictional manner with the toothing 8 of the upper part 2". The backrest part 6 can then be pivoted in a freely swinging manner, for example in the direction of the seat part. It is locked there in the table and/or easy entry position by the hook 19 which interacts with the indentation 2'.1. The locking takes place, for example, by means of release or renewed actuation of the unlocking lever 15. As a result, the hook 19 moves counterclockwise in the direction of the indentation 2'.1 and the hook 19 interlocks therewith (FIG. 4*d*) in such a manner that the backrest cannot rotate in the clockwise direction. Since the tumbling mechanism basically causes an eccentric movement of the backrest part 6 relative to the fitting part 7 on the seat part side, the indentation 2'.1 and the hook 19 are designed in such a manner that they enter into engagement with each other in every position of the parts 6, 7 with respect to each other and secure the backrest part 6 in the table and/or easy-entry position. The hook 19 has a bolt 19.2 which engages in an elongated hole 5.1 in the latching pawl 5. As a result, the rotational movement of the hook 19 and of the latching pawl 5 is at least partially synchronized. In addition, in the present case, the fitting has an easy-entry blocking cam 22. Said easy-entry blocking cam 22 actuates and locks the hook 19. The easy-entry blocking cam 22 is connected to the cam 4 and rotates together therewith. In the easy-entry position, the easy-entry blocking cam 22 secures the hook 19 against inadvertent unlocking. In order to release the locking in the table and/or easy-entry position, the blocking cam 4 is rotated counterclockwise and, in the process, carries along the latching pawl 5. Since the latching pawl 5 transmits at least part of its rotational movement to the hook 19, the hook 19 is also rotated in the clockwise direction, as a result of which the locking between the hook 19 and the indentation 2'.1 is released. The backrest can then be brought again into the use position and locked there with the upper part 2".

The fitting according to FIGS. 5*a*-5*d* substantially corresponds to the fitting according to FIGS. 4*a*-4*d*, but, in the present case, the latching of the hook 19 in the table and/or easy-entry position does not take place with an indentation but rather with a lug 2'.1. Otherwise, reference is made to explanations with regard to FIGS. 4*a*-4*d*.

A person skilled in the art will see that the fitting 1 in FIGS. 2-5 may be designed as a "lamellar fitting" which has more than one, preferably two, lower parts 2' and upper parts 2", and/or more than one, preferably two, latching pawls 5 and blocking cams 4, and in which the mounting 7 and the hook 19 are located in the center and are merely of simple design.

The invention claimed is:

1. A motor vehicle seat comprising:
    a seat part;
    a backrest;
    a fitting for adjusting an inclination of the backrest relative to the seat part, the fitting comprising a lower part having a first complimentary interlocking means in a first position, and an upper part having a second complimentary interlocking means in a second position, wherein the lower part is coupled to the seat part; and
    a backrest part coupled to the backrest and mounted in a freely swinging manner relative to the upper part, the backrest part comprising a latching means having an interlocking means to selectively lock the backrest part in a plurality of positions, wherein the plurality of positions comprises the first position of the lower part and the second position of the upper part, wherein the interlocking means of the latching means comprises a first region and a second region, the first region being engageable with the first complimentary interlocking means of the lower part and the second complimentary interlocking means of the upper part.

2. The motor vehicle seat as claimed in claim 1, wherein the interlocking means comprises teeth.

3. The motor vehicle seat as claimed in claim 1, wherein the interlocking means comprises larger interlocking means in the first region than in the second region.

4. The motor vehicle seat as claimed in claim 1, wherein the latching means comprises a latching pawl.

5. The motor vehicle seat as claimed in claim 4, wherein the backrest part comprises a first blocking cam and the latching pawl is selectively lockable via the first blocking cam in a use position, an easy-entry position and a table position.

6. The motor vehicle seat as claimed in claim 5, comprising a second blocking cam which interacts with the interlocking means.

7. The motor vehicle seat as claimed in claim 6, wherein the first blocking cam and the second blocking cam have a common axis of rotation.

8. The motor vehicle seat as claimed in claim 6, wherein the second blocking cam actuates and/or locks the interlocking means.

9. The motor vehicle seat as claimed in claim 1, wherein the upper part and lower part comprise a tumbling mechanism.

10. The motor vehicle seat as claimed in claim 5, wherein the interlocking means engages with the first complimentary interlocking means of the lower part and the second complimentary interlocking means of the upper part via a larger interlocking means and/or by an extended locking curve on the latching means, said locking curve interacting with the first blocking cam.

11. The motor vehicle seat as claimed in claim 1, wherein the interlocking means and the latching means have a common axis of rotation.

12. The motor vehicle seat as claimed in claim 1, wherein the fitting comprises multi-layered construction.

\* \* \* \* \*